United States Patent
Hanft et al.

(10) Patent No.: US 9,351,478 B2
(45) Date of Patent: May 31, 2016

(54) ELECTRONIC PET ENTERTAINMENT DEVICE

(71) Applicants: Joshua Hanft, New York, NY (US); Leslie Hanft, New York, NY (US); James Hanft, New York, NY (US)

(72) Inventors: Joshua Hanft, New York, NY (US); Leslie Hanft, New York, NY (US); James Hanft, New York, NY (US)

( * ) Notice: Subject to any disclaimer, the term of this patent is extended or adjusted under 35 U.S.C. 154(b) by 43 days.

(21) Appl. No.: 13/961,198

(22) Filed: Aug. 7, 2013

(65) Prior Publication Data
US 2015/0040836 A1 Feb. 12, 2015

(51) Int. Cl.
*A01K 15/02* (2006.01)

(52) U.S. Cl.
CPC .................................... *A01K 15/025* (2013.01)

(58) Field of Classification Search
CPC ..... A01K 1/0157; A01K 15/00; A01K 15/02; A01K 15/021; A01K 15/024; F21V 33/00; F21V 33/006; F21V 33/0028
USPC .......... 119/702, 705, 706, 707–711; 362/153, 362/234, 253
See application file for complete search history.

(56) References Cited

U.S. PATENT DOCUMENTS

| | | | | |
|---|---|---|---|---|
| 4,737,764 A * | 4/1988 | Harrison | ...................... | 362/153 |
| 4,754,372 A * | 6/1988 | Harrison | ...................... | 362/565 |
| 4,794,373 A * | 12/1988 | Harrison | .................. | 340/286.01 |
| 7,800,511 B1 * | 9/2010 | Hutchison et al. | ......... | 340/691.1 |
| 8,444,294 B1 * | 5/2013 | Hawkins | ...................... | 362/234 |
| 8,894,233 B2 * | 11/2014 | Van Herpen et al. | ......... | 362/153 |
| 2011/0286213 A1 * | 11/2011 | Van Herpen et al. | ......... | 362/234 |

* cited by examiner

*Primary Examiner* — David Parsley
*Assistant Examiner* — Danielle Clerkley
(74) *Attorney, Agent, or Firm* — James Hanft

(57) ABSTRACT

An interactive cat entertainment device wherein light elements are incorporated into a carpet in a pattern. The light elements are controlled through a microprocessor or electronic circuitry that activates the lights sequentially to provide the appearance of a moving object to a cat or similar animal.

17 Claims, 3 Drawing Sheets

ELECTRONIC PET ENTERTAINMENT DEVICE

TECHNICAL FIELD OF THE INVENTION

The present invention relates generally to an entertainment device for pets. In particular, microprocessor controlled light elements are integrated into a floor covering, where the light elements are controlled to provide a pattern of sequential movements to simulate movement that stimulates pets, and in particular feline house pets.

BACKGROUND OF THE INVENTION

Household pets, and especially felines, require stimulation and exercise to remain mentally and physically healthy. Many different toys and entertainment devices have been developed to provide felines with such stimulation and exercise. As examples, simulated "mice", plastic balls and similar items permit cats to bat them around, chase after them and pick them up. These devices simulate, to a certain degree, the playing of a feline with their prey. However, the felines quickly grow tired of these devices because they are predictable, and do not provide new and different stimuli. An interactive cat toy is provided by a feather, cloth or the like attached to the end of a rod, pole or stick, or having the feather or cloth tied to a string which is tied to the rod, pole or stick. A person would then manipulate the pole along the floor or in the air. The feline is attracted by the movement and "stalks" the toy, pouncing on it when it is within reach. Another example of an interactive cat toy is the use of a laser pointer. A laser pointer produces a dot of intense light on most surfaces that the laser pointer is directed towards. The dot of intense light may be moved at any speed from one point to another. Felines tend to stalk the projected point of light as they would a physical object. However, the light is projected, so the feline will not be able to catch the light as the feline might a physical object.

With the advance in lighting technology, smaller, less expensive and more economical lighting elements have become available. An example is fiber optic cables and light emitting diode arrays ("LEDs"). Lighting elements have been incorporated into such things as apparel and carpeting. As an example, LEDs and fiber optic lights have been incorporated into t-shirts and shoes. The lights are activated by a manual switch, pressure switch or through a switch that activates when the shoe impacts or lifts from the ground. Lighting has also been incorporated into flooring and carpeting. For example, the lighting may be used for guiding occupants of a building along a path of travel towards an exit as described in EP0323682. The lighting is provided in modular carpet tiles, with some tiles having light transmissive molded plastic housings positioned over openings containing LEDs. The LEDs are energized via an electric cable. Textiles containing optical fibers are also known in the art as shown in US2007/0037462, which describes manufacturing distributed optical fiber scrim comprising functional optical fibers. As another example, US2011/026213 describes a light transmissive multi-layer carpet tile and carpeted floor having a lighting system. As yet another example, U.S. Pat. No. 4,794,373 describes a lighting strip apparatus for visually guiding occupants of airplanes and office buildings. While the incorporation of lighting into clothing and textiles is known, it has not been used for animal entertainment purposes.

Therefore, it is with respect to these considerations and others that the present invention has been made.

DETAILED DESCRIPTION

Various embodiments will now be described with reference to the accompanying drawings, which form a part of the description, and which show, by way of illustration, specific embodiments. However, this invention may be embodied in many different forms and should not be construed as limited to the embodiments set forth herein. Rather, these embodiments are provided so that this disclosure will be thorough and complete, and will fully convey the scope of the invention to those skilled in the art. The following detailed description is not to be taken in a limiting sense.

In one embodiment of the invention, light elements are incorporated into a carpet in a pattern. The light elements are controlled through a microprocessor or electronic circuitry that activates the lights sequentially to provide the appearance of a moving object to a cat or similar animal. In another embodiment of the invention, the starting of the light element sequence is random, motion or sound activated. In another embodiment, the carpeting includes a vertical scratching post, where the light elements run horizontally on the carpeting and then vertically, and are included in the light element pattern.

Figure 1:
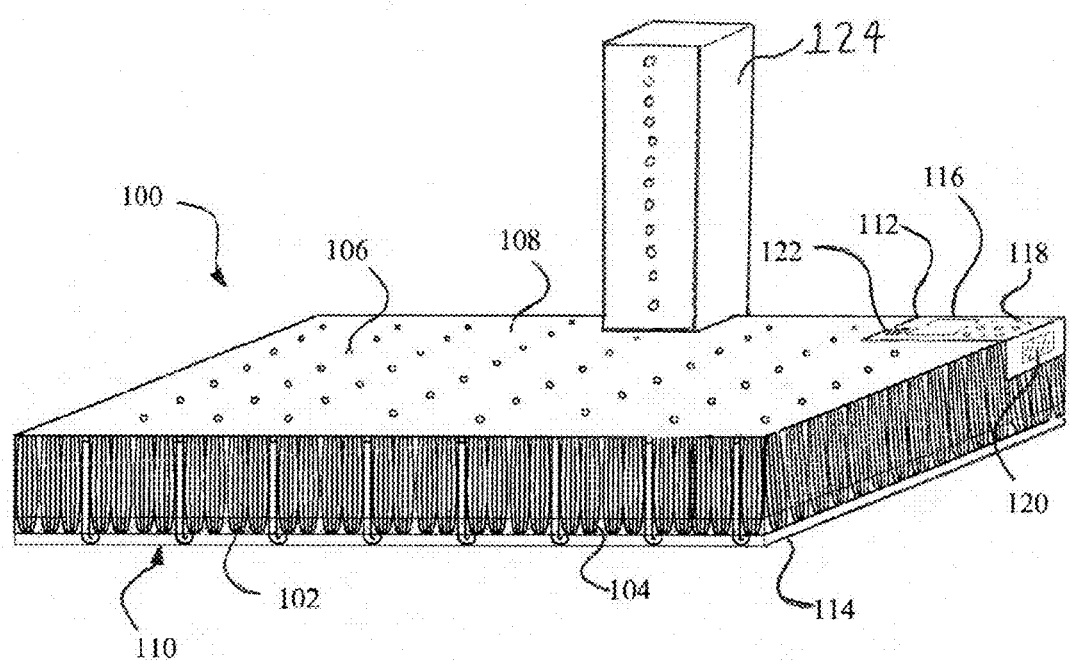
FIG. 1 is a perspective view of one embodiment of the present invention.

As shown in FIG. 1, interactive entertainment device 100 is comprised of pile 102 attached to backing 104, into which light elements 106 are interspersed in various intervals. Interactive entertainment device 100 may be any size, but is typically several feet wide by several feet long and generally has a low height, typically less than one inch and preferably in one embodiment an approximately ¼ inch pile.

Pile 102 is generally either made from single or blended natural or synthetic fibers such as wool, polypropylene, nylon or polyester, and may consist of twisted tufts that are often heat-treated to maintain their structure. Such tufted carpets have the pile injected into backing 104, which may then be bonded to a secondary backing to provide stability. The pile may contain loops or cut piles, and are tightly packed. This configuration permits felines to "sharpen" their claws on the pile, which permits the removal of the outer layer or sheath on their claws, marks their territory, and allows them to flex their feet and claws. Although tufted carpets are described, any type of similar structure may be used.

Figure 2:
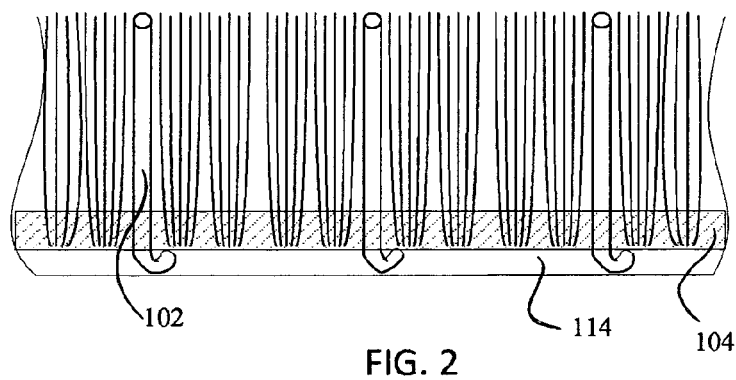
FIG. 2 shows a side view of one embodiment of the present invention.
Figure 3:
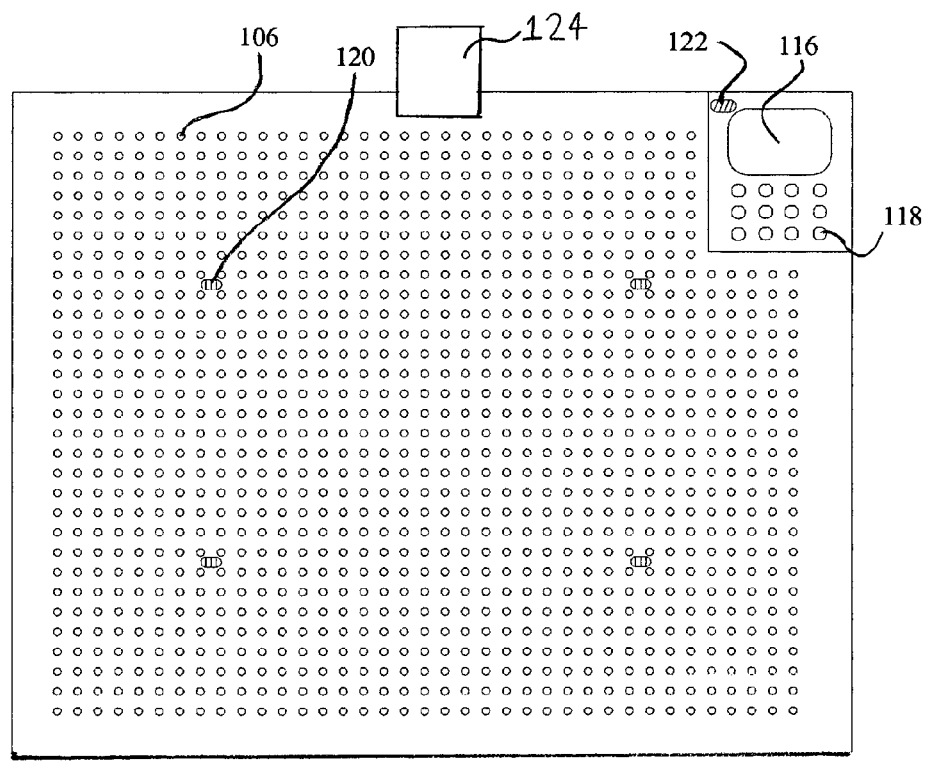
FIG. 3 illustrates a top view of one embodiment of the present invention.

Light elements 106 consisting of fiber optic light strands that extend from bottom surface 110 near backing 104 to top surface 108 of pile 102. Fiber optic strands are effective because they are waveguides that can extend from the controller/light source to the point of emission, which does not have to be in a straight line. The end of the fiber optic strands would be shaped to provide a point light source. In one embodiment, the fiber optic strands run from a central controller to each desired location. In this embodiment, the fiber optic strands may run through layer 114, as shown in FIG. 2, which may have an additional bottom layer to protect the fiber optic strands and/or hold them in place. In another embodiment, the light source for the fiber optic strands would be positioned below the pile 102, with the fiber optic strands extending the depth of the pile, with the light sources being connected to and controlled by a central controller. Light elements 106 may consist of other light sources such light emitting diodes or other methods of having light emitting from a point at or near top surface 108. Light elements 106 are interspersed within the pile within a distance from one another that, when sequentially activated, it appears that a "dot" of light is moving across the surface of the pile. The light elements may be interspersed between every $4^{th}$ to every $10^{th}$ tuft or strand of carpet pile. Thus, in an area of the carpet with 20 by 20 tufts or strands, there would be between 4 and 25 light elements. The choice of the number of light elements would be made depending on the carpet pile, strength of the light source, ability to economically and practically achieve a certain density of the light sources and whether such density provides a sufficient appearance of a moving dot or point of light. In another embodiment, the light sources may be structured similar to that provided in U.S. Pat. No. 4,794,373, where the light elements are below the pile. The position of the light elements may consist of different patterns, such as circles tangent to one another, varying numbers of rows and/or columns, or other geometric or asymmetric patterns. These alternative shapes may be more desirable to the extent that a reduced number of light points are used due to cost or configuration requirements. In yet another embodiment, the light sources may be located below the pile and gaps may be place in the pile as described in U.S. Patent Application No. 2011/0286213. In yet another embodiment, LED arrays may be placed within the pile to provide the point of light effects.

Figure 4:
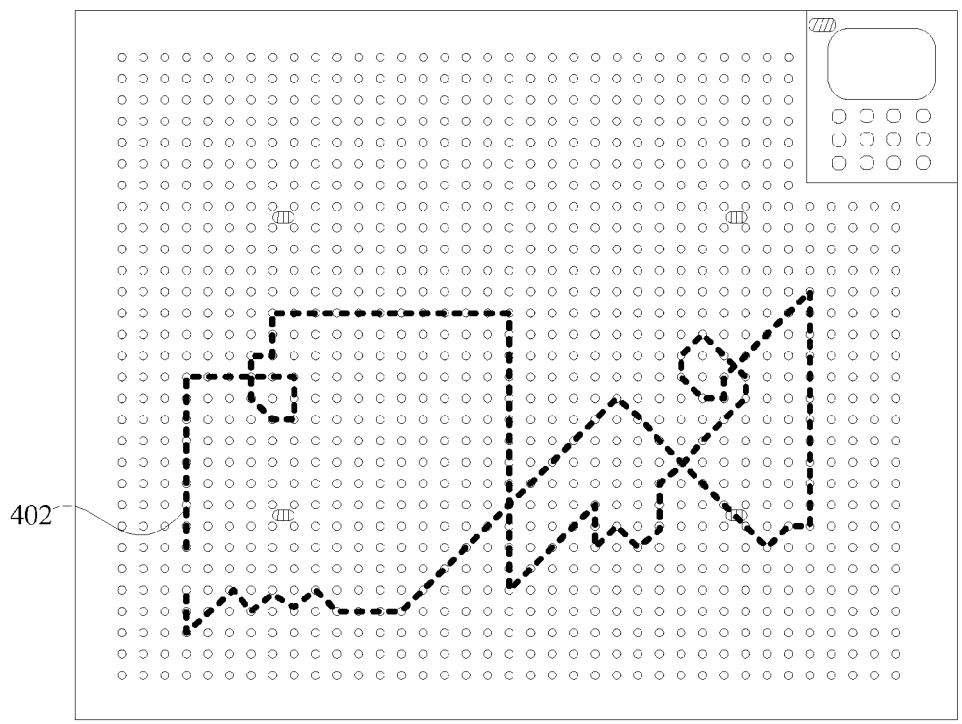
FIG. 4 shows an illustration of the operation of one embodiment of the present invention.

An example of the appearance of movement of a point of light through light elements 106 are shown in FIG. 4, as pathway 402. Each light element 106 would be momentarily turned on sequentially along pathway 402. The apparent "speed" of the "point of light" may be varied, have sudden stops and turns. The pattern may be determined to maximize the interest of felines or other domesticated animals. The pattern may also be varied so that new and interesting movements are generated to keep the animals interest.

Light elements 106 are connected to controller 112. Controller 112 may be located on top of pile 102, on the side or any other suitable location. Controller 112 may be battery powered or can be powered through an AC power source. Controller 112 may be microprocessor driven with a display 116, keypad 118, speaker 120 and microphone 122. In the simplest form, interactive entertainment device 100 may simply be turned on through a power switch or activated by plugging it into a power source. The microprocessor would be programmed to control activation of light elements 106. As an example, microprocessor outputs may control activation of LED arrays that act as the light sources for the fiber optic strands. The activation would typically be sequential serial lighting of fiber optic strands that are adjacent, thus providing the look of a moving dot of light. This may be accomplished through implementation of a mathematical progression algorithm, or may be as simple as reading light states stored in memory. Preferably the progressions will vary to keep the feline's interests. Controller 112 may contain multiple different progressions that may be programmable by a user, or may contain different modes of operation. For example, controller 112 may be programmed to activate during different times of the day or night, may have varying lengths of time of operation or be set onto a random mode that activates and runs varying programs and modes on an unpredictable basis. Various methods of updating the sequential programs may be provided either through key entries, memory transfer or wireless connections.

In another embodiment, microphone 122 may be used to determine the presence of an animal or, since many cats tend to be quiet, a motion sensor may be used. The sounds or motions may activate the interactive entertainment device to attract the interest of the feline. The device may be activated for only limited periods of time, again so as not to acclimatize the animal to the interactive device and keep their interest.

In yet another embodiment, the interactive device may contain a vertical scratching post 124 with the embedded lights running up it. The lights may be used to encourage the feline to use the scratching post, and provide further entertainment.

Although other modifications and changes may be suggested by those skilled in the art, it is the intention of the inventors to embody within the patent warranted hereon all changes and modifications that reasonably and properly come within the scope of their contribution to the art.

We claim:

1. An entertainment device comprising:
   a flexible backing material having a length, width and an upper planar surface;
   woven or no woven carpeting having a pile depth and attached to the flexible backing material along substantially the entire upper planar surface of the backing material;
   a plurality of lighting elements interspersed between the woven or non woven carpeting and extending substantially the pile depth; and
   a control unit connected to the plurality of lighting elements that sequentially activates the light elements to create the appearance of a moving point of light tracing a non-linear path across an upper surface of the carpeting and
   a vertical extension extending above the pile depth and covered by woven or non-woven carpeting having a further plurality of lighting elements interspersed between the carpet fibers.

2. The device of claim 1 further comprising:
   the control unit being capable of changing the non-linear path across the upper surface of the carpeting.

3. The device of claim 1 further comprising:
   a speaker coupled to the woven or non woven carpeting;
   the speaker being coupled to and controlled by the control unit; and
   the control unit being programmed to generate sounds through the speaker to attract the attention of the domestic animal.

4. The device of claim 1, wherein the control unit activates the lighting elements during a pre-programmed time period.

5. The device of claim 1 further comprising:
   a motion sensor for activating the control unit when motion is detected in the proximity of the device.

6. The device of claim 1 wherein the lighting elements are comprised of either LED arrays or fiber optic lights.

7. The device of claim 1 wherein the lighting elements are interspersed along the length and width of the carpeting where the ratio of tufts to lighting elements are between 10 tufts to 1 lighting element and 4 tufts to 1 lighting element.

8. An entertainment device comprising:
   a carpet having a length, width and pile depth;
   a plurality of lighting elements interspersed within the carpet and form a two dimensional array along the length and width of the carpet; and a central controller coupled to the plurality of lighting elements, the controller being capable of generating a sequential light turn-on pattern moving from one light element to an adjacent light element within the plurality of lighting elements to approximate an appearance of a moving point of light within the two dimensional array, the light turn-on pattern moving from one light element to an adjacent light element being substantially in a non-linear pattern; and a vertical extension extending above the carpet and having a further polarity of lighting elements interspersed within carpet surrounding at least a portion of the vertical extension.

9. The device of claim 8 further comprising:
the central controller being capable of changing the non-linear pattern of the point of light across an upper surface of the carpeting to appear to accelerate by periodically decreasing a delay period for turn on between adjacent light elements.

10. The device of claim 8 further comprising:
a speaker coupled to the carpet;
the speaker being coupled to and controlled by the central controller; and
the central controller being programmed to generate sounds through the speaker to attract the attention of the domestic animal.

11. The device of claim 8, wherein the central controller activates the lighting elements in random intervals during a pre-programmed time period.

12. The device of claim 8 further comprising:
a motion sensor for activating the central controller when motion is detected in the proximity of the device.

13. The device of claim 8 wherein the lighting elements are comprised of fiber optic strands that extend substantially the pile depth.

14. The device of claim 8 wherein the lighting elements are interspersed along the length and width of the carpeting where the ratio of tufts to lighting elements are between 10 tufts to 1 lighting element and 4 tufts to 1 lighting element.

15. A method of entertaining a domestic animal comprising:
embedding lighting elements along the length and width of a carpet, with the lighting elements oriented to emit light vertically from an upper surface of the carpet; and
sequentially activating the lighting elements to generate an appearance of a moving point of light by sequentially activating and deactivating adjacent light elements, where the moving point of light appears to be periodically stationary, accelerate, decelerate and change directions on the upper surface of the carpet; and
embedding lighting elements on an extension extending above the upper surface of the carpet; and
sequentially activating the lighting elements on the extension to generate a appearance of the moving point of light moving from the lighting elements along the length and width of the carpet to the lighting elements on the extension.

16. The method of claim 15 further comprising:
generating sounds from a speaker to attract the attention of a domestic animal in coordination with the activation of the lighting elements.

17. The method of claim 15 further comprising:
activating the lighting elements in response to detection of movement by a motion sensor.

\* \* \* \* \*